United States Patent [19]
Nichols

[11] Patent Number: 6,012,488
[45] Date of Patent: Jan. 11, 2000

[54] SEGMENTING VALVE

[75] Inventor: Jon A. Nichols, Santa Rosa, Calif.

[73] Assignee: Rheodyne, L.P., Rohnet Park, Calif.

[21] Appl. No.: 09/179,348

[22] Filed: Sep. 17, 1998

[51] Int. Cl.⁷ .................................................. F16K 11/074
[52] U.S. Cl. .................................. 137/625.11; 137/625.15
[58] Field of Search ........................ 137/625.11, 625.14, 137/625.46, 627, 625.15; 73/864

[56] References Cited

U.S. PATENT DOCUMENTS

| | | | |
|---|---|---|---|
| 2,743,739 | 5/1956 | Mansen | 137/627 X |
| 2,948,299 | 8/1960 | Cassell | 137/627 X |
| 2,964,061 | 12/1960 | Rawson et al. | 137/627 |
| 5,316,042 | 5/1994 | Lim et al. | 137/625.11 |
| 5,623,965 | 4/1997 | Snider et al. | 137/627 X |
| 5,803,117 | 9/1998 | Olsen et al. | 137/625.11 X |
| 5,810,049 | 9/1998 | Raque et al. | 137/625.11 |

Primary Examiner—John Rivell
Assistant Examiner—Meredith H. Schoenfeld
Attorney, Agent, or Firm—Leon D. Rosen

[57] ABSTRACT

A valve that receives sample and solvent streams, and delivers slugs of different fluid samples separated by slugs of the solvent, to a detector. The valve includes a stator (140) having a central hole (40) and a circle of sample holes (51–54) and solvent holes (91–94). The valve also includes a rotor (150) with a first groove (162) that connects one of the sample or solvent holes to the central hole to flow to the detector. The first groove is wide enough and the space between adjacent supply holes is small enough, that as the first groove moves from one hole of the circle to the next, the groove becomes partially open to the next hole before it leaves the last hole to minimize the sudden increase in pressure along the flow to the detector. The stator face has a waste recess (144) and the rotor has one or more waste grooves (171–177) that extend between the first circle and the waste recess, so when a sample from a sample hole is not flowing as a slug toward the detector, the sample instead flows to the waste recess for disposal, to minimize the sudden increase in pressure at the sample holes.

14 Claims, 5 Drawing Sheets

SEGMENTING VALVE

BACKGROUND OF THE INVENTION

A fluid containing a plurality of compounds, can be analyzed by separating the fluid into different compounds as by HPLC (high pressure liquid chromatography), and by passing each compound through a detector. Within the last few years, mass sensitive detectors such as mass spectrometers, are available, which can detect a small sample (of perhaps 100 nanoliters) in a short period of time such as 20 seconds. The analyzing process can be accomplished more rapidly and in a simpler manner by a mechanism that can take a plurality of different sample flows (where each can come from a different HPLC unit) and flow a small slug of each sample at a time to the detector, with a slug of solvent between the slugs of different samples to identify the beginning and end of each sample slug. Such a mechanism preferably minimizes pressure pulses in the flow of the sample and solvent slugs towards the detector, so a largely constant pressure of fluid is applied to the detector, and so largely constant sample pressure is maintained at the output of each HPLC unit. An apparatus of relatively simple construction and operation which could separate a plurality of sample streams and a solvent stream, to produce a single detector stream of sample slugs separated by solvent slugs, and which minimized pressure pulses along the sample streams and along the detector stream would be of value.

SUMMARY OF THE INVENTION

In accordance with one embodiment of the present invention, an apparatus and method are provided for receiving a plurality of different sample flows and a pressured solvent, which can be operated to deliver to a detector, slugs of the different sample flows separated by slugs of the solvent. A valve includes a stator with a stator face having a central hole at its axis and having a ring of supply holes concentric with the axis. The supply holes include alternate sample holes that are each connected to a different pressured sample source, and alternate solvent holes that are each connected to the source of pressured solvent. A rotor lying facewise against the stator face, has a first groove with an inlet end positioned to connect to holes of the ring of holes, and has an outlet end that connects to the central hole in the stator. Thus, as the rotor rotates, it first receives a slug of a sample, then receives a slug of the solvent, and then receives a slug of a next sample, etc. to flow the slugs along a single detector stream to the detector.

The supply holes are close enough, and the width of the first groove is great enough, that when the inlet end of the first groove lies halfway between a pair of holes (one a sample hole and the other a solvent hole), the inlet end of the first groove overlaps both holes. As a result, there is flow from both holes through the first groove to the outlet. This avoids excessive pulsing of the detector stream, which could result in a large sudden drop in the pressure of fluid flowing to the detector, which is undesirable.

The stator face has a waste recess with portions lying on a second circle that is concentric with the circle of holes but which has a different diameter. The rotor has at least one waste groove with an inlet end lying on the first circle of holes and with an outlet end coupled to the waste recess. The waste groove(s) is(are) positioned so when a sample hole is not connected to the first groove to pass a sample to the detector, that sample hole is connected through the waste groove to the waste recess. This avoids excessive pulsing in the sample flow which could result in a large sudden increase in pressure in the sample stream, which is undesirable.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
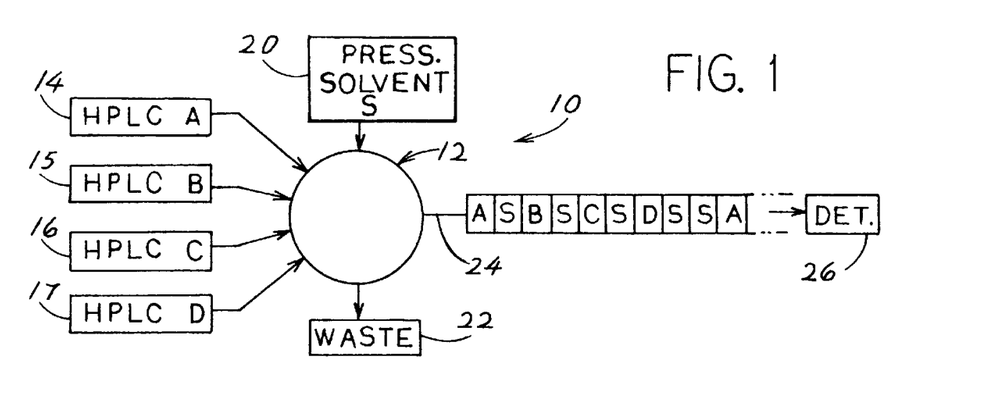
FIG. 1 is a diagrammatic view of apparatus of the present invention.

FIG. 1 is a schematic diagram of a system 10 of the present invention, which includes an apparatus in the form of a valve 12 that receives four different sample flows from four different sources. The sources may be HPLC (high pressure liquid chromatographic) units 14–17 that deliver sample streams labeled A through D. A source 20 of pressurized solvent is also delivered to the valve, and a waste or dump 22 is connected to the valve to receive waste fluid. The valve has a system outlet or detector stream 24 through which slugs of the different samples A, B, C and D are delivered, with slugs of two different samples being separated by a slug of the solvent S. The stream of slugs is delivered to a detector 26 such as a high speed mass spectrometer.

Figure 2:
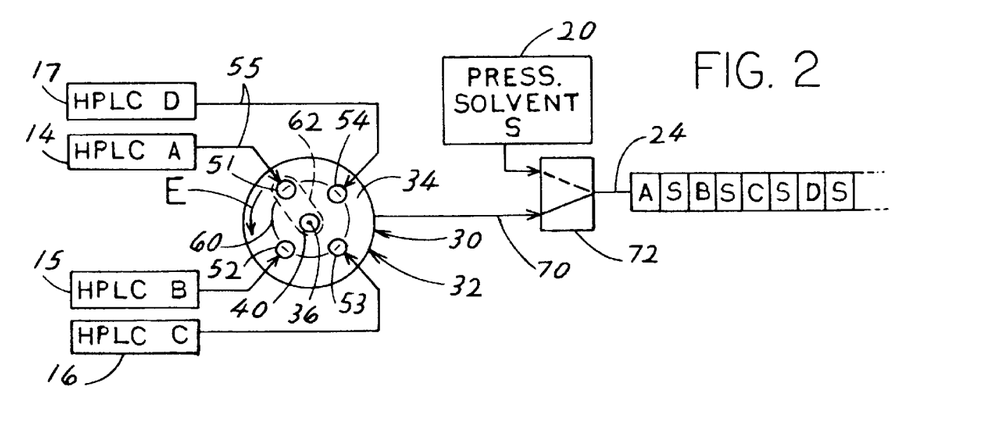
FIG. 2 is a simplified view of a first embodiment of the invention.
Figure 6:
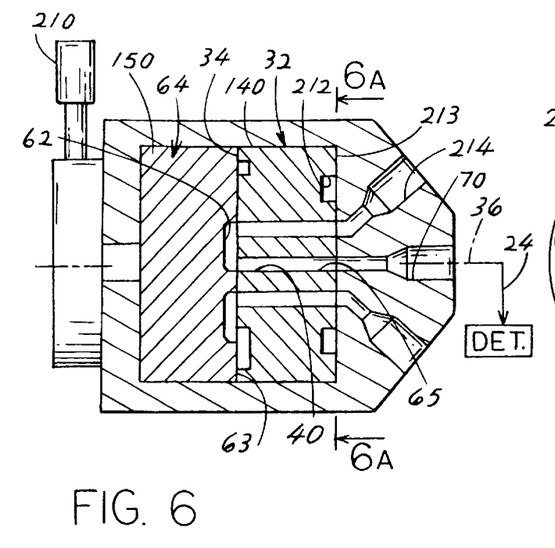
FIG. 6 is a sectional view of a segmenting valve of a fourth embodiment of the invention.

FIG. 2 shows the construction of a valve 30 of a first embodiment of the invention. The valve includes a stator 32 with the face 34 of the stator being shown. The stator has an axis 36 and has a center hole 40 at the axis. The stator face also has four sample holes 51–54 which each receives a sample flow from a conduit 55 connected to a corresponding one of the units 14–17. The four sample holes lie on a first circle 60 that is concentric with the axis. A rotor whose face is facewise adjacent to the face 34 of the stator, has a first groove 62. FIG. 6 shows the basic construction of the valve, showing how the face 34 of the stator 32 lies facewise against the face 63 of the rotor 64 and showing the first groove 62 in the rotor which communicates with holes in the stator. The center hole 40 and a passage 65 lead to a valve outlet 70.

Referring again to FIG. 2, it can be seen that as the rotor turns counterclockwise so the first groove 62 moves in the direction E, slugs of one sample at a time move from a sample hole such as 51 and through the first groove 62 to the center hole 40 and through the valve outlet 70.

FIG. 2 shows a supplemental valve 72 which is connected to the valve outlet 70 and to the outlet of the source 20 of pressured solvent. The valve can be switched to deliver either a slug of sample from the valve outlet 70 or a slug of solvent from the source 20 to the detector stream 24. As in FIG. 1, the system outlet or detector stream 24 includes a slug of each type of sample, with each sample slug being separated from another sample slug by a slug of solvent. Although the system of FIG. 2 can provide slugs for the detector, it has several disadvantages.

One disadvantage of the system of FIG. 2 is that it requires operation of two separate valves 30, 72 at proper times. Another disadvantage is that pressure in the system outlet 24 has large pressure pulses, with the pressure dropping to nearly zero when the first groove 62 is moving from one sample hole to the next, and when the supplemental valve 72 is switching between a sample and the solvent. It is desirable that the pressure in the system outlet 24 not drop to nearly zero as slugs of samples and solvent are supplied. Another disadvantage is that the flow of sample out of each of the holes 51–54 suddenly stops and the pressure rises at that sample hole, when the first groove 62 is not connected to that sample hole. It is desirable that the pressure at a sample hole and at the output of the corresponding HPLC unit rise only moderately when a sample slug is not being drawn from a sample hole for flow through the detector.

Figure 3:
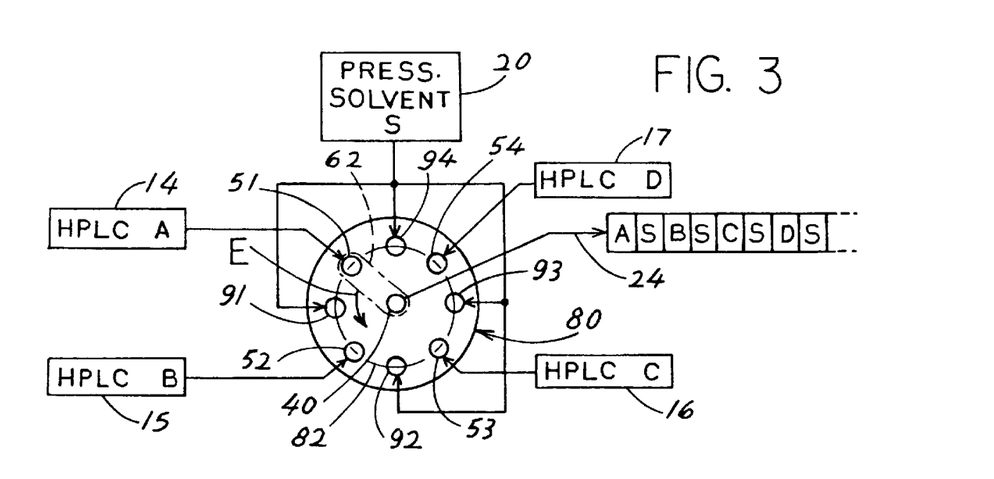
FIG. 3 is a simplified view of a second embodiment of the invention.

FIG. 3 is a view of a valve 80 which simplifies the system of FIG. 2. The valve 80 has a ring of supply holes lying on a first circle 82, with the supply holes being divided between sample holes 51–54 that are connected to the HPLC units 14–17, and solvent holes 91–94 that are each connected to the source of pressured solvent 20. The sample holes 51–54 alternate with the solvent holes 91–94, in that each solvent hole such as 91 lies circumferentially (with respect to axis 36) between a pair of sample holes 51, 52. As the rotor turns in the direction of arrow E, the first groove 62 connects the center hole 40 so first a slug of sample is delivered, then a slug of solvent is delivered, etc. However, as in FIG. 2, there is a sudden large drop in pressure at the system outlet 24 between the flowout of slugs, and there is a sudden large increase in pressure at each of the sample hole 51–54 when a sample slug is not being taken from that hole.

Figure 4:
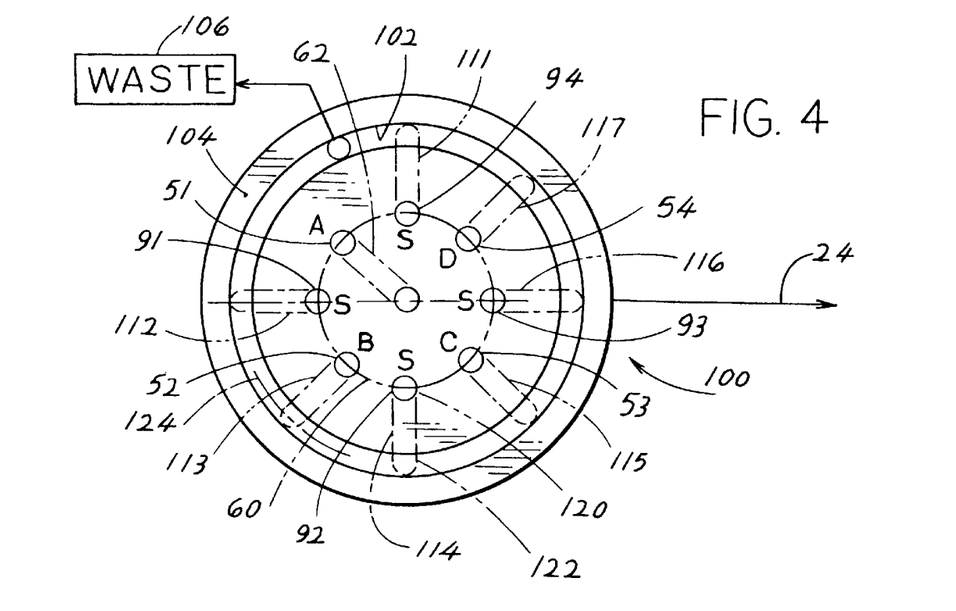
FIG. 4 is a simplified view of a third embodiment of the invention.

FIG. 4 illustrates another system with a valve 100, which has the advantage of the valve of FIG. 3 in providing a simple apparatus for delivering sample slugs separated by solvent slugs. The valve 100 also avoids sudden increases in back pressure pulses at each sample hole 51–54 when a sample slug is not being drawn therefrom for passage to the detector. Applicant avoids such high back pressure by providing a waste recess 102 in the face 104 of the stator, the waste recess being connected to a dump or waste 106 such as a laboratory sink. Also, applicant provides a plurality of waste grooves 111–117 in the rotor. Each waste groove has one end 120 lying on the first circle 60 where the supply holes 51–54 and 91–94 lie. Each waste groove also has an opposite end 122 lying on a second circle 124 that is larger than the first circle and where at least a portion of the waste recess 102 lies. The waste recess is shown as a continuous ring lying on the second circle 124. As a result, whenever one sample hole such as 51 is connected to the first groove 62 to flow out a sample slug, each of the other sample holes 52–54 can flow out sample fluid to avoid a high back pressure caused by sudden stoppage of flow. The samples emanating from the holes 52–54 are dumped by flowing to the waste 106, which avoids a high back pressure. The valve of FIG. 4 has the disadvantage that there are pulses in pressure at the system outlet 24, and the additional disadvantage that there is a wastage of solvent since solvent from holes 91–94 also flows to the waste 106. It is noted that the disadvantage of solvent wastage is generally not as important as the large changes in pressure at the sample holes and at the system outlet.

Figure 5:
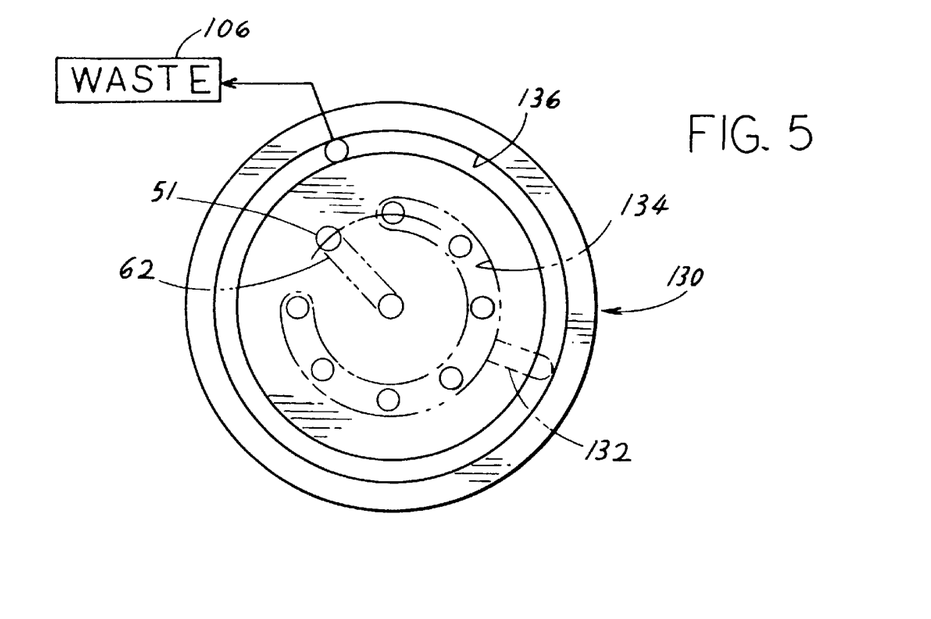
FIG. 5 is a simplified view of a modified third embodiment of the invention.

FIG. 5 shows a valve 130 similar to that of FIG. 4, except that a single continuous waste groove 132 with a ring portion 134 is provided which connects all supply holes to a waste recess 136 and to the dump 106, except for the particular supply hole 51 which is being connected to the first groove 62 in the rotor.

Figure 7:
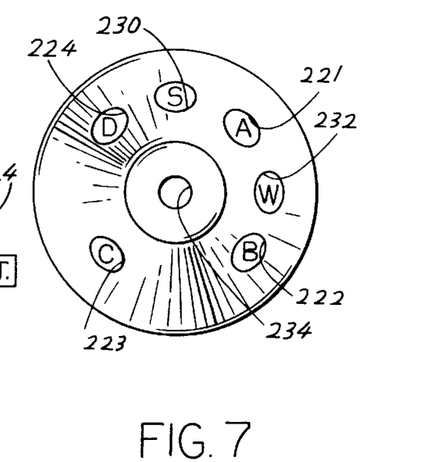
FIG. 7 is an end view of the valve of FIG. 6.
Figure 8:
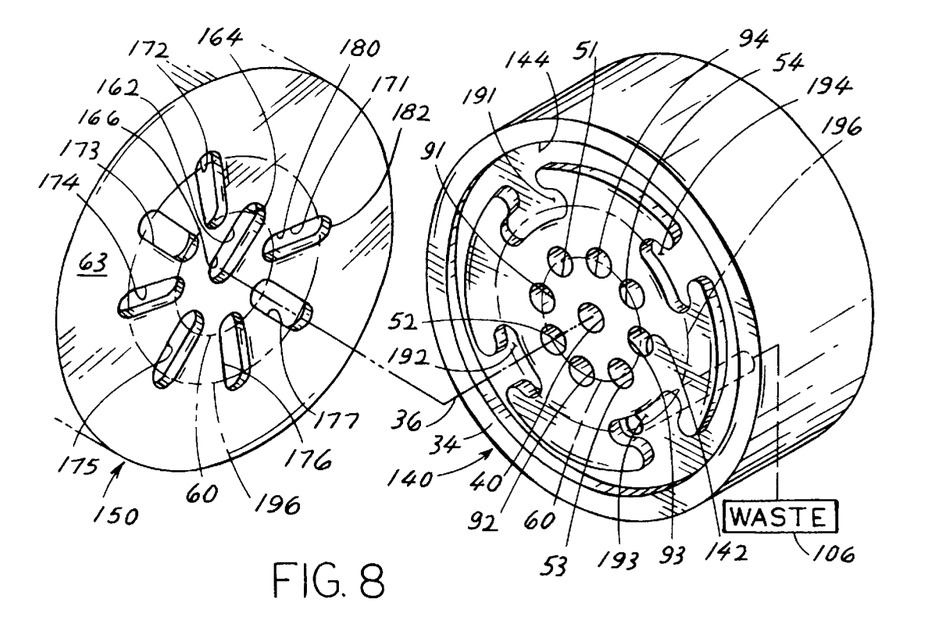
FIG. 8 is an exploded partial isometric view of the valve of FIG. 6.

FIGS. 6–10 illustrate a preferred embodiment of the invention, which is of simple construction, avoids large drops in pressure at the system outlet 24, and avoids large increases in pressure at the sample holes. As shown in FIG. 8, the stator 140 has a ring of supply holes 142 that include the four sample holes 51–54 that are each connected to a different pressured sample source, and four solvent holes 91–94 that are all connected to the source of pressured solvent. All of the supply holes lie on the first circle 60 that is concentric with the axis 36. The stator also has a waste recess 144 which is connected to a dump 106 such as a laboratory sink.

FIG. 8 shows that the rotor 150 has a rotor face 63 with a first groove 162 that has inlet and outlet ends 164, 166. The inlet end 164 lies on the same first circle 60 that the supply holes 142 of the stator lie. The rotor, which is rotatable about the axis 36, also has seven waste grooves 171–177. Each waste groove has a radially inner end 180 which lies on the first circle 60 to open to the supply holes 142 that also lie in that circle. Each waste groove also has a radially outer end 182 for coupling to the waste recess 144 in the stator, as will be described below.

The waste recess 144 has four recess sections 191–194. Each of the recess sections lies on a second circle 196 which has a larger diameter than the first circle 60. The outer ends 182 of the rotor waste grooves 171–174 also lie on the second circle 196. Whenever the rotor is turned so the outer end 182 of a waste groove is aligned with one of the recess sections 191–194, fluid can flow through the waste groove to the dump.

Figure 9:
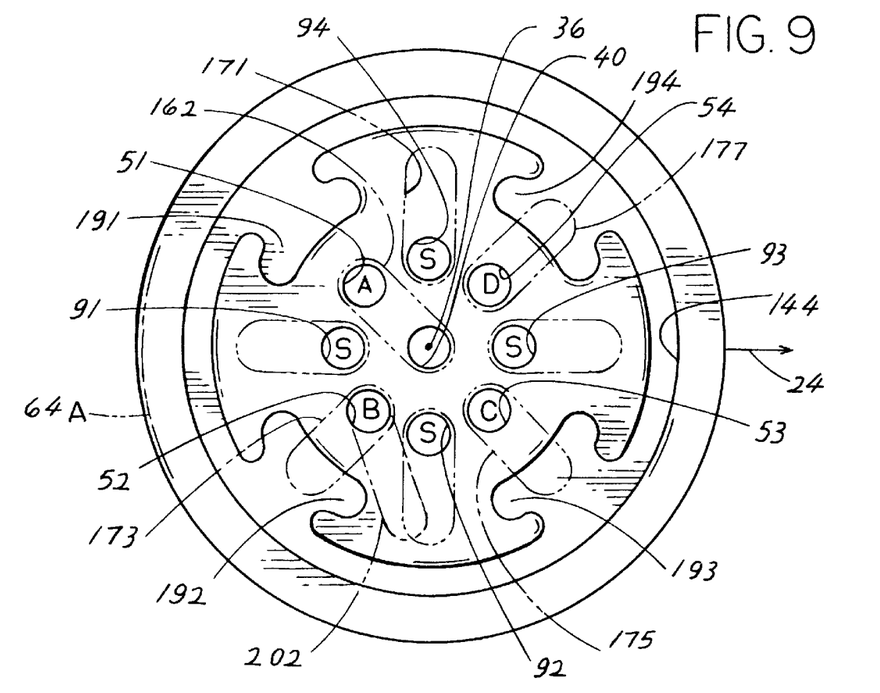
FIG. 9 is an elevation view of the stator face of the stator of FIG. 8 and showing, in phantom lines, grooves of the rotor of FIG. 8, where a first groove is completely aligned with a sample hole.

FIG. 9 shows the rotor at a first position 64A wherein the first groove 162 connects the center hole 40 to the first sample hole 51 which receives the sample A. During the time of the rotor position shown in FIG. 9, a slug of the sample A is being passed to the system outlet 24. At the same time, fluid continues to flow out of each of the other three holes 52–54 by flowing through a corresponding one of the three waste grooves 173, 175 and 177 that are connected to one of the recess sections 192–194. It is noted that no waste groove connects the sample hole 51 to the waste section 191. It is also noted that fluid does not pass out of any one of the four solvent holes 91–94 to the waste recess 144 to be dumped. This is because only the sample holes 52, 53, 54 are aligned with the waste recesses 192, 193, 194 to be connected thereto by a waste groove. None of the sample holes 91–94 lies radially inward of a waste section. It should be noted that the waste grooves 171–177 do not have to extend only radially to the axis 36, but instead they could extend at an incline to the axis as indicated by groove 202, in which case the waste sections have to be appropriately positioned.

Thus, by providing the waste sections 191–194 that each lies opposite one of the sample holes, applicant avoids wasting solvent, while avoiding sudden rises in pressure at the sample holes 51–54, and while providing a single flow path to the outlet 24 when the first groove 162 is over a solvent hole.

Figure 10:
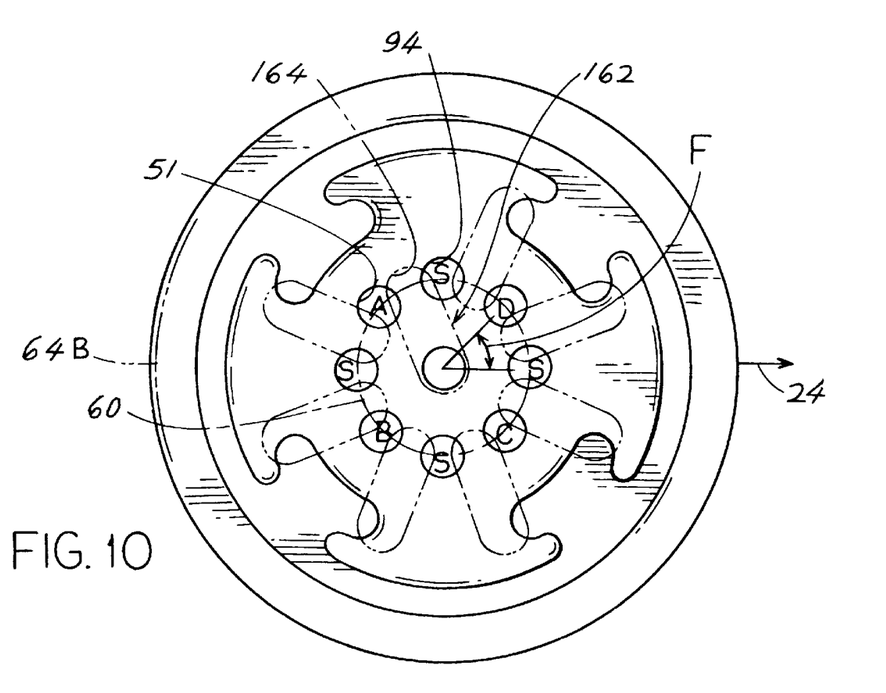
FIG. 10 is a view similar to that of FIG. 9, but with the first groove lying halfway between full alignment with a sample hole and full alignment with an adjacent solvent hole.

FIG. 10 illustrates the stator at 64B after it has been rotated by 22.5°, which is half the circumferential, or angular separation F of 45° between adjacent supply holes. It can be seen that the inlet end 164 of the first groove 162 lies halfway between two supply holes 51, 94. It can be seen that the inlet end 164 of the first groove is wide enough that in this position which is halfway between full alignment with two adjacent supply holes, the groove inlet end 164 is in partial alignment with both of the holes 51, 94. That is, fluid can flow from both the sample hole 51 and the solvent hole 94 into the inlet end 164 of the first groove, to flow to the system outlet. The advantage of this arrangement is that the pressure of fluid in the system outlet 24 does not suddenly drop to near zero between flowout of a sample slug and flowout of the next solvent slug. Although the pressure in the sample outlet varies, it does not vary as much as in the embodiments shown in FIGS. 2–5.

It is usually desirable that the inlet end 164 of the first groove 162 have the same radius of curvature as each of the supply holes, and especially the sample supply holes 51–54, to avoid trapping of sample fluid in a "dead space". In FIGS. 9 and 10, the width of the first groove 162 is shown as being slightly greater than the diameters of the supply holes, but only to aid in the illustration. In practice, the width of the groove inlet end is preferably the same as the diameters of the supply holes. To achieve significant overlap as shown in FIG. 10 for the inlet end 164 of the groove, applicant selects the diameter of the first circle 60 as well as the diameters of the holes so there is considerable overlap with the first groove. It is noted that the circumferential space between adjacent holes such as 51 and 94 must be appreciable to assure strength of the stator.

An overlap of at least 5% of each of the holes such as 51 and 94 in the midway position of FIG. 10, and an overlap that is preferably at least about 10% at each of the holes, is desirable to avoid a large drop in pressure at the system outlet. It is noted that there are restrictions in the flow of fluid from the center hole 40 and through various tubing to the detector, so a moderate reduction in the coupled area at the groove inlet end 164 from 100% to 10%, causes only a smaller percentage drop in pressure at the detector. It is desireable that the flow rate be maintained at at least one-third of maximum, and preferably at least half of maximum at any position between full alignment with the two adjacent supply holes.

Figure 11:
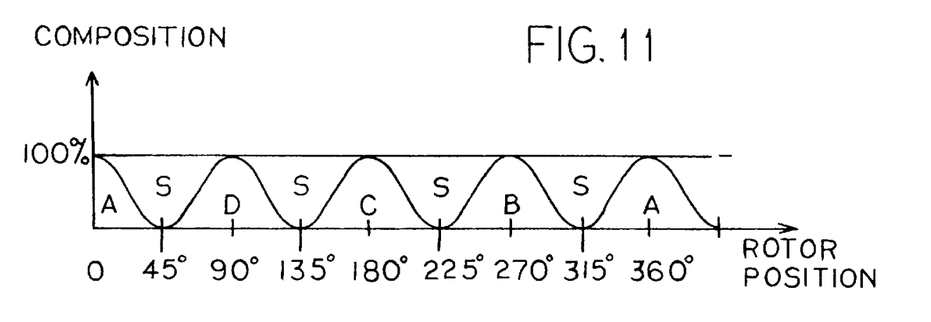
FIG. 11 is a graph showing a variation in composition with rotor position for the valve of FIGS. 6–10.

FIG. 11 is a graph showing change in the composition of fluid passing to the system outlet 24 as the rotor continually turns. The symbols A, B, C, and D refer to each of the four different samples, while the letter S refers to the solvent. It can be seen that the percent of sample rises to 100% at positions of 0°, 90°, 180°, and 270°. A detent or electronic stop can be provided at each of these positions.

Figure 12:
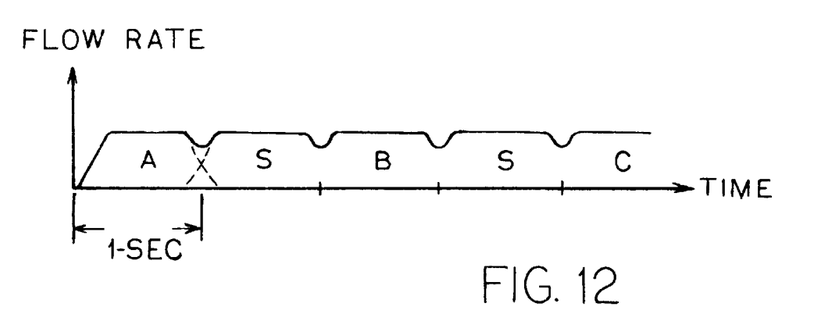
FIG. 12 is a graph showing variation in flow rate with time during sequencing of the valve of FIGS. 6–10.

FIG. 12 shows variation in the flow rate with time as the rotor is turned. It can be seen that the flow rate drops between switchover from a sample such as A or B to the solvent S. However, the flow rate does not decrease as much as the decrease in area through which the first groove inlet end communicates with the corresponding sample or solvent hole.

Figure 6A:
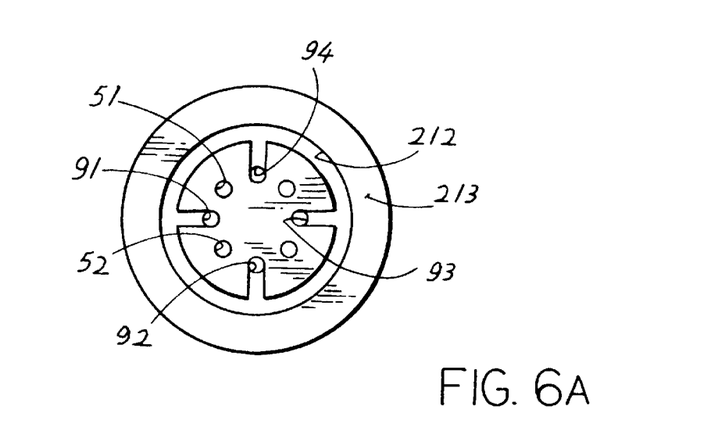
FIG. 6A is a view taken on line 6A—6A of FIG. 6.

FIG. 6 shows a system where a handle 210 is provided to turn the rotor 64 although it is most common to use a stepping motor. FIG. 6 also shows a solvent ring groove 212 at a distal end face 213 of the stator opposite the stator face 34, to distribute solvent to each of the four solvent holes. FIG. 6A shows the construction of the stator distal end face 213, and shows fluid couplings at 214 to make connections to connectors at the ends of tubes. FIG. 7 shows four inlets 221–224 which connect to the four sample holes, and also shows a solvent inlet 230, a waste outlet 232 and a valve outlet 234 that connects to the central hole and the system outlet 24.

Thus, the invention provides a valve for passing slugs of selected samples followed by slugs of solvent, to a detector, which is of simple construction and operation, and which avoids large pressure drops in the system outlet and large pressure rises at the sample holes. A stator has a ring of supply holes lying on a first circle, including alternate sample and solvent holes. A rotor has a first groove that connects a selected one of the supply holes to a center hole, so as the rotor turns a sample slug is passed to the system outlet followed by a solvent slug, etc. Large increases in pressure at the sample holes are avoided by providing a waste recess and by providing at least one waste groove in the rotor which connects the sample holes to the waste recess when the sample hole is not being connected through the first groove to the center hole. Usage of solvent is minimized by providing the waste recess with segments that each lie opposite a sample hole but not a solvent hole. Large drops in pressure at the system outlet are avoided by constructing the first groove and the supply holes so the inlet end of the first groove overlaps both adjacent holes (one a sample hole and one a solvent hole) when halfway between the holes. It is noted that while a valve with planar faces is shown, there are also valves with cylindrical surfaces of the stator and rotor that lie adjacent. Although a four-inlet sample system has been described, any number of sample inlets may be positioned around the circle, with solvent holes between each pair of sample inlet holes.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A valve comprising:

a stator having a plurality of sample inlets for receiving pressured sample flows, said stator having a solvent inlet for receiving pressured solvent, and said stator having a valve outlet for delivering sample slugs that each comprise a quantity of a selected sample followed by a quantity of solvent;

said stator having an axis, and having a stator face with a center hole lying on said axis and connected to said valve outlet, and having a plurality of supply holes lying on a first circle that is concentric with said axis with said supply holes including a plurality of sample holes each connected to one of said sample inlets and a plurality of solvent holes each connected to said solvent inlet, with said sample holes circumferentially alternating with said solvent holes;

a rotor which is pivotable about said axis with respect to said stator, said rotor having a rotor face that lies facewise against said stator face, said rotor face having a first groove with an inlet end lying on said first circle and an outlet end lying at said axis to open to said center hole.

2. The valve described in claim 1 wherein:

said supply holes lie circumferentially close enough to each other and said first groove inlet end is wide enough, that the inlet end of said first groove opens to both a predetermined sample hole and a predetermined solvent hole when said inlet end is halfway between a first position in alignment with only said predetermined sample hole but not the solvent hole and a second position in alignment with only said predetermined solvent hole but not said sample hole, to thereby minimize pressure pulses in said valve outlet.

3. The valve described in claim 1 wherein:

said supply holes all have substantially the same diameter, and said inlet end of said first groove has substantially the same width as the diameter of said supply holes;

said supply holes are circumferentially close enough that when said first groove inlet end is halfway between said first and second positions the area of said first groove that opens to said predetermined solvent hole is at least 5% of the area of one of said supply holes at said stator face, and the area of said first groove that opens to said predetermined sample hole is at least 5% of the area of one of said supply holes at said interface.

4. The valve described in claim 1 wherein:

said stator has a waste recess with portions lying on a second circle that is concentric with but of different diameter than said first circle;

said rotor has at least one waste groove that has an inlet end lying on said first circle and an outlet end lying on said second circle, with said waste groove being angularly spaced from said first groove.

5. The valve described in claim 1 including:

a plurality of units that each generates a sample flow of a different compound, with each of said units connected to a different one of said sample inlets of said stator;

a source of pressured solvent connected to said solvent inlet of said stator.

6. A valve having a plurality of sample inlets for receiving pressured sample flows, said valve having a solvent inlet for receiving pressured solvent, and said valve having a valve outlet for delivering sample slugs that each comprise a quantity of a selected sample followed by solvent, comprising:

a stator having an axis, said stator having a stator face with a center hole lying on said axis and connected to said outlet, and said stator having a plurality of supply holes lying on a first circle that is concentric with said axis with said supply holes including a plurality of sample holes each connected to one of said sample inlets and a plurality of solvent holes each connected to said solvent inlet, with said sample holes circumferentially alternating with said solvent holes;

a rotor which is pivotable about said axis with respect to said stator, said rotor having a rotor face that lies facewise against said stator face, said rotor face having a first groove with an inlet end lying on said first circle and an outlet end lying at said center hole;

said supply holes lying circumferentially close enough to each other and said first groove inlet end is wide enough, that the inlet end of said first groove connects to both a predetermined sample hole and a predetermined solvent hole when said inlet end is halfway between a first position in alignment with only said predetermined sample hole but not the solvent hole and a second position in alignment with only said predetermined solvent hole but not said sample hole.

7. The valve described in claim 6 wherein:

said inlet end of said first groove is wide enough that it opens to at least about 10% of the area of said predetermined sample and solvent holes when said inlet end is halfway between said first and second positions.

8. A valve having a plurality of sample inlets for receiving pressured sample flows, said valve having a solvent inlet for receiving pressured solvent, and said valve having an outlet for delivering sample slugs that each comprise a quantity of a selected sample followed by solvent, comprising:

a stator having an axis, said stator having a stator face with a center hole lying on said axis and connected to said outlet, and said stator having a plurality of supply holes lying on a first circle that is concentric with said axis with said supply holes including a plurality of sample holes each connected to one of said sample inlets and a plurality of solvent holes each connected to said solvent inlet, with said sample holes circumferentially alternating with said solvent holes;

a rotor which is pivotable about said axis with respect to said stator, said rotor having a rotor face that lies facewise against said stator face, said rotor face having a first groove with an inlet end lying on said first circle and an outlet end lying at said center hole;

said stator has a waste recess with portions lying on a second circle that is concentric with but of different diameter;

said rotor has at least one waste groove that includes an inlet end lying on said first circle and an outlet end lying on said second circle, with said waste groove being angularly spaced from said first groove.

9. The valve described in claim 8 wherein:

said rotor has a plurality of waste grooves including said at least one waste groove, with said plurality of waste grooves each having an inlet end positioned to connect to one of said supply holes and an outlet end positioned to connect to said waste recess, with said first groove being angularly spaced from said waste grooves so at a time when there is a sample flow from a sample hole into said first groove there is not also a flow from the same sample hole through a sample waste groove.

10. The valve described in claim 8 wherein:

said waste recess has a plurality of sections that each lies on said second circle, with each of said sections angularly located to lie radially outward of one of said sample holes, but said waste recess being devoid of sections lying radially outward of one of said solvent holes along said waste grooves, to pass each sample to said waste recess sections, but to not pass said solvent to said waste recess sections.

11. A method for delivering to a detector, fluid sample slugs from each of a plurality of different sample-holding conduits, with pairs of sample slugs separated by a fluid solvent slug from a solvent-holding conduit, comprising:

connecting each of said sample-holding conduits to a different one of a plurality of spaced sample holes that lie on a first circle in a face of a stator, where said first circle is centered on an axis;

connecting said solvent-holding conduit to each of a plurality of solvent holes that lie on said first circle, where said solvent holes lie between pairs of said sample holes;

turning about said axis, a rotor that has a rotor face lying facewise against said stator face where said rotor has a first groove in said rotor face and where said first groove has an inlet end lying on said first circle and said first groove has an outlet end coupled to said detector to flow fluid from one of sample holes into said first groove toward said detector and then to flow fluid from one of said solvent holes into said first groove toward said detector, and to then flow fluid from another sample hole into said first groove toward said detector, as said rotor turns, to thereby alternately flow a different sample slug and a solvent slug to said detector.

12. The method described in claim 11 including:

establishing a waste recess in said stator face, on a second circle of greater diameter than said first circle and concentric with the axis of said first circle;

establishing at least one waste groove in said rotor face so the waste groove extends between said first and second circles;

establishing said rotor in a first position, and while said rotor lies in said first position flowing sample fluid from a first of said sample holes to said detector while flowing sample fluid from each of the other sample holes through said at least one waste groove into said waste recess.

13. The method described in claim 11 wherein:

said step of flowing fluid from one of said sample holes and then from one of said solvent holes, includes first aligning said inlet end of said first groove with said one sample hole and then with said one solvent hole, as said rotor turns;

said step of flowing includes positioning said inlet end so it is aligned simultaneously with both said one sample hole and said one solvent hole and flowing both sample fluid and solvent fluid at the same time into said inlet end of said first groove to flow toward said detector.

14. The method described in claim 13 wherein:

said step of flowing both sample fluid and solvent fluid at the same time includes maintaining a minimum flow rate, as said rotor turns, which is at least one-third the maximum flow rate when said inlet end is aligned with only a sample hole or only a solvent hole.

* * * * *